United States Patent Office 3,539,477
Patented Nov. 10, 1970

3,539,477
GRAFT POLYMERS OF CELLULOSE ESTERS AND PROCESS FOR THEIR MANUFACTURE
Hans Dieter Hermann, Frankfurt am Main, Germany, assignor to Farbwerke Hoechst Aktiengesellschaft vormals Meister Lucius & Bruning, Frankfurt am Main, Germany, a corporation of Germany
No Drawing. Filed Dec. 16, 1968, Ser. No. 784,185
Claims priority, application Germany, Dec. 19, 1967, F 54,340
Int. Cl. G08b 21/02, 21/04, 21/06
U.S. Cl. 260—13                     3 Claims

ABSTRACT OF THE DISCLOSURE

Graft polymers of cellulose esters are prepared by cationic polymerization of trioxane and cyclic ethers, cyclic acetals or linear polyacetals in the presence of partially saponified cellulose esters. The graft polymers obtained are thermoplastic and are used for the manufacture of shaped articles by injection-moulding or extrusion.

---

The present invention relates to graft polymers and a process for their manufacture.

It has already been proposed to manufacture graft polymers from polyacetals and other polymers which can be processed in the thermoplastic range. The manufacture of such graft polymers may be carried out, for example, by cationic polymerization of trioxane in the presence of polymers with lateral ester or acetal groups. In this way trioxane can be grafted on polyvinyl acetate or on cellulose acetobutyrate. Grafting takes place by the chain transfer effect of the lateral ester groups. Yet this chain transfer effect is but weak, so that the grafting degree attainable is only low. Moreover, the esters of cellulose are mostly insoluble in trioxane, so that the manufacture of graft polymers is not possible in many cases.

Now I have found that graft polymers of cellulose esters can be obtained in the presence of cationic initiators at temperatures within the range of 0 to 120° C. by polymerizing trioxane together with 0.1% to 50% by weight of a cyclic ether with 3 to 5 ring members or of a cyclic acetal with 5 to 9 ring members or of a linear polyacetal in the presence of from 0.01% to 10% by weight of a cellulose ester, 2 to 40% of which has been saponified.

The present invention provides also graft polymers based on cellulose esters containing in the side chain copolymers of trioxane with 0.1 to 50% by weight of a cyclic ether with 3 to 5 ring members, of a cyclic acetal with 5 to 9 ring members or of a linear polyacetal.

By cellulose esters there are to be understood esters of cellulose with aliphatic carboxylic acids with 1 to 18 carbon atoms, for example formates, acetates, propionates, butyrates, isobutyrates and stearates as well as mixed esters, for example, acetobutyrates. Cellulose acetate is preferably used.

The saponification degree of the cellulose esters is preferably within the range of from 2% to 40%. Esters which have been saponified to an extent of 5% to 20% are especially suitable. The grafting is carried out under conditions known for the copolymerization of trioxane. A particularly advantageous mode of execution is the polymerization of a solution of the cellulose ester in trioxane and comonomers. But it is also possible to carry out the polymerization in the presence of an auxiliary solvent, for example of an aliphatic or aromatic hydrocarbon or a halogenated hydrocarbon. It is not necessary that monomers and cellulose esters are completely dissolved in the auxiliary solvent, that is polymerization is also possible in suspension. In any case, however, the plurally saponified cellulose ester should be dissolved in the monomer phase or at least swelled therein.

The grafting also takes place if trioxane is polymerized per se with partially saponified cellulose ester, but it is more favourable to carry out the grafting in the presence of comonomers, because in this case a higher yield of more stable and better stabilizable polymers is obtained.

By the process in accordance with the invention cyclic ethers with 3 to 5 ring members, cyclic acetals with 5 to 9 ring members or linear polyacetals with their acetal groups in the main valency chain are polymerized on the partially saponified cellulose ester as comonomers of the trioxane.

As cyclic ethers there are advantageously used epoxides, for example propylene oxide, phenoxypropene oxide, styrene oxide, epichlorhydrin, preferably ethylene oxide, furthermore oxetane and its derivatives, for example 3,3-bis chloromethyl)-oxetane and tetrahydrofurane. Of the group of the cyclic acetals that are advantageously used cyclic formals, for example, 1,3-dioxolane, 1,3-dioxane, 1,3-dioxacycloheptane, 1,3-dioxacycloheptene and 1,3,6-trioxacyclooctane, as well as aryl or alkyl derivatives of cyclic formals, for example 4-phenyl-1,3-dioxolane or 4-methyl-1,3-dioxane. As comonomers, also other cyclic acetals are suitable, for example derivatives of the above 1,3-dioxacycloalkanes substituted in the 2-position by methyl, ethyl, phenyl, chloromethyl or vinyl groups. Finally linear polyacetals may be used which are split in the polymerization and therefore act as comonomers. Those linear polyacetals can be obtained by polymerization or copolymerization of the cyclic acetals mentioned or from dihydric alcohols, for example trans-quinitol or p-xylylene diol, and aldehydes, preferably formaldehyde.

The comonomers mentioned are used in amounts within the range of from 0.1% to 50% by weight. Preferably 0.5% to 15% by weight comonomer is used.

As polymerization initiators the cationic initiators known for the polymerization of trioxane are suitable, for example protonic acids, Lewis acids as well as complexes and complex salts of Lewis acids.

Of these innumerable compounds there may be mentioned: $HClO_4$, $BF_3$, $SnCl_4$, $SbF_5$, $SbCl_5$, $FeCl_3$ as well as the etherates of these halides, furthermore carbonium, diazonium, or oxonium salts of complexes of Lewis acids, for example $[O_2N-C_6H_4-N_2]BF_4$, $[C_6H_5-N_2]SbF_6$, $[(C_2H_5)_3O]BF_4$ and $[(C_6H_5)_3-]AsF_6$.

The initiators are used in concentrations within the range of from 0.001 to 1% by weight, preferably 0.001% to 0.1% by weight, calculated on the monomer mixture. The polymerization temperature depends on the method used. In the presence of an auxiliary solvent the polymerization is carried out at temperatures within the range of from 0 to 120° C. It is advantageous to choose such a high temperature that the whole trioxane is present in the liquid phase. There are preferably applied, especially in the polymerization in substance, temperatures within the range of from 50 to 100° C.

After the polymerization it is generally necessary to deactivate the initiator and to remove unreacted monomers as well as unstable proportions of polymer. To this effect any of the known methods may be applied. Thus, for example, the polymer may be extracted with a solvent in the presence of alkali. The initiator is thus neutralized and any unreacted proportions of monomer removed. Thereafter unstable proportions of polymer may be decomposed in solution or in the melt in the presence of alkali and/or stabilizers. It is also possible to carry out the deactivation of the initiator, the removal of the monomers and the elimination of unstable proportions of polymer in one stage in solution or in the melt at temperatures within the range of from 100° to 220° C.

When removing the unstable proportions of polymer, the nature and concentration of the alkali used are of importance. The conditions are advantageously chosen in a manner such that the ester groups of the proportion of cellulose ester in the polymer are not saponified or are saponified to a small extent only. That is the case when working in the absence of alkali or if in a treatment taking no longer than 15 minutes at most 0.2% by weight of an aliphatic amine or ammonia is added.

In some cases it may be desirable to saponify the proportion of cellulose ester to a higher degree or completely. In these cases it is recommended to use stronger bases in higher concentration, for example alkali metal hydroxides or alkali metal salts of weak acids in concentrations within the range of from 0.2% to 10% by weight, calculated on the polymer.

The polymers which have been freed from unstable proportions are advantageously stabilized before processing. The stabilization of the polymers against the action of oxygen, heat and light may be carried out as in the case of the known copolymers of trioxane. Suitable heat stabilizers are for example amides and polyamides, amidines and urea compounds. As stabilizers against oxidation phenols, preferably bis-phenols, and aromatic amines are advantageously used. As light stabilizers it is advantageous to use α-hydroxybenzophenones and triazines.

The melt index values of the stabilized graft polymers, measured according to DIN 53 735, are for $i_2$ within the range of from 0.5 to 20, preferably 1 to 15; the ratio of the melt index values $i_{20/2}$ is from 20 to 200, preferably from 25 to 100. Furthermore, fillers, pigments or lubricants may be added to the polymer in known manner.

The graft polymers according to the invention can be processed in the thermoplastic range and are especially suitable for the manufacture of shaped articles, for example bars, rods, plates, films or tubes, injection-moulding and extrusion being the most suitable processes. As compared with the known copolymers of trioxane or formaldehyde the polymers of the invention are distinguished by an improved flow of the melt under pressure, an improved bonding property and an improved dye receptivity.

The following examples serve to illustrate the invention but are not intended to limit it.

EXAMPLE 1

2 grams of cellulose acetate containing 31.5% acetyl were dissolved at 70° C. in 100 grams of a mixture of 98% by weight trioxane and 2% by weight ethylene oxide. 15 milligrams p - nitrophenyldiazoniumfluorborate were added to this solution, after which the mixture solidified to a solid block. The block was maintained at 70° C. for a further 60 minutes and then ground and boiled with acetone. A raw polymer was obtained in a yield of 85%. For further stabilization this raw polymer was dissolved in 10 times the amount of benzyl alcohol in the presence of 0.2% by weight of triethanolamine and maintained at 150° C. for 10 minutes. When pouring the hot solution into a mixture of equal parts of methanol and methylene chloride, graft polymer freed from unstable proportions precipitated. By recording of the infrared spectrum it was demonstrated that the whole amount of cellulose acetate had been incorporated in the polymer.

EXAMPLE 2

In 100 grams respectively of a mixture of 96% by weight trioxane and 4% by weight 1,3-dioxolane the amounts of cellulose acetate indicated in the following table, containing 39.4% acetyl were dissolved. The polymerization was started by addition of a solution of 10 milligrams $BF_3.O(C_4H_9)_2$ in 1 millimeter cyclohexane. After 1 hour the polymers were ground and boiled with acetone. The conversion values indicated in the following table refer to this raw product.

For the removal of unstable proportions test samples of 20 grams each of the obtained polymers were dissolved under pressure in aqueous methanol of 60% by weight strength containing 0.1% by weight triethylamine and maintained at 145° C. for 10 minutes. The polymers precipitated after cooling were washed with acetone and dried. After addition of 0.5% by weight 2,2′-methylene-bis(4-methyl-6-tert.butylphenol) and 0.1% by weight dicyandiamide the melt index values of the polymers were measured at 190° C. under 2 kilograms charge ($i_2$) and 20 kilograms charge ($i_{20}$). The values in the following table show that the ratio $i_{20}/i_2$ and with it the flow under elevated pressures increased with increasing amounts of grafted cellulose ester.

TABLE

| | Amount of cellulose acetate, g. | Extent of conversion, percent by weight | Melt index of the stabilized polymer | | |
|---|---|---|---|---|---|
| | | | $i_{20}$ | $i_2$ | $i_{20}/i_2$ |
| (a) | | 84 | 117 | 5.4 | 22 |
| (b) | 0.05 | 91 | 59 | 2.4 | 25 |
| (c) | 0.1 | 87 | 74 | 2.7 | 27 |
| (d) | 0.5 | 82 | 194 | 4.7 | 41 |
| (e) | 1.0 | 79 | 282 | 3.0 | 94 |

EXAMPLE 3

5 grams cellulose-n-butyrate which had been saponified to an extent of 11.1% were dissolved at 80° C. in a mixture of 90 grams trioxane and 10 grams 1,3-dioxacycloheptane. The polymerization was started at 80° C. by 2 milligrams anhydrous perchloric acid, dissolved in 0.2 milliliter nitrobenzene. After 30 minutes the solid block of polymer was ground and boiled with five times the amount of acetone which contained 0.1% by weight triethylamine. After washing with acetone and drying a polymer was obtained in a yield of 99% into which the total amount of cellulose ester had been incorporated and which, after stabilization according to Example 2, possessed an excellent processibility.

What is claimed is:
1. A process for the manufacture of a graft polymer of a cellulose ester of an aliphatic acid in the presence of a cationic initiator at a temperature within the range of from 0 to 120° C. which comprises polymerizing trioxane with 0.1% to 50% by weight of a cyclic monoether with 3 to 5 ring members, or of a cyclic acetal with 5 to 9 ring members or of a linear polyacetal in the presence of 0.01 to 10% by weight of said cellulose ester which had been saponified to an extent of 2 to 40%.

2. A process as claimed in claim 1, wherein cellulose acetate is used as the cellulose ester.

3. A graft polymer of a cellulose ester of an aliphatic acid containing in the side chain a copolymer of trioxane with 0.1 to 50% by weight of a cyclic monoether with 3 to 5 ring members, or of a cyclic acetal with 5 to 9 ring members or of a linear polyacetal.

References Cited
UNITED STATES PATENTS 2,394,910  2/1946  Gresham _____ 260—2
3,218,295  11/1965  Cline _____ 260—67
3,364,157  1/1968  Malek et al. _____ 260—13

WILLIAM SHORT, Primary Examiner

E. A. NIELSEN, Assistant Examiner

U.S. Cl. X.R.

264—176